United States Patent
Maniowski et al.

(10) Patent No.: US 8,066,105 B2
(45) Date of Patent: Nov. 29, 2011

(54) HYDRAULIC SUSPENSION DAMPER

(75) Inventors: Michal Dariusz Maniowski, Cracow (PL); Waldemar Widla, Krakow (PL)

(73) Assignee: BWI Company Limited S.A., Luxembourg (LU)

( * ) Notice: Subject to any disclaimer, the term of this patent is extended or adjusted under 35 U.S.C. 154(b) by 766 days.

(21) Appl. No.: 11/985,331

(22) Filed: Nov. 14, 2007

(65) Prior Publication Data
US 2008/0121478 A1    May 29, 2008

(30) Foreign Application Priority Data

Nov. 24, 2006    (EP) ..................................... 06024367

(51) Int. Cl.
*F16F 9/34*    (2006.01)
(52) U.S. Cl. ................................. 188/322.15; 188/282.1
(58) Field of Classification Search .................. 188/280, 188/284, 282.5, 282.6, 322.13, 322.14, 322.15, 188/315, 281, 282.1, 282.8
See application file for complete search history.

(56) References Cited

U.S. PATENT DOCUMENTS

| | | | | |
|---|---|---|---|---|
| 2,619,199 A | * | 11/1952 | Schwary | 188/284 |
| 2,742,112 A | * | 4/1956 | Wessel | 188/284 |
| 3,057,441 A | * | 10/1962 | Pribonic et al. | 188/284 |
| 3,677,561 A | * | 7/1972 | McNally | 280/124.157 |
| 4,602,707 A | * | 7/1986 | Zumwinkel et al. | 188/315 |
| 5,219,414 A | * | 6/1993 | Yamaoka | 188/284 |
| 5,823,306 A | * | 10/1998 | de Molina | 188/322.15 |
| 6,199,671 B1 | | 3/2001 | Thyssen | |
| 6,318,523 B1 | | 11/2001 | Moradmand et al. | |
| 6,776,269 B1 | * | 8/2004 | Schel | 188/287 |
| 6,913,128 B2 | * | 7/2005 | Muller | 188/322.15 |

FOREIGN PATENT DOCUMENTS

| | | | |
|---|---|---|---|
| DE | 3737173 A1 | * | 5/1989 |
| EP | 1669632 A1 | | 12/2005 |
| GP | 2180320 A | | 9/1986 |

OTHER PUBLICATIONS

European Search dated Apr. 27, 2007.

* cited by examiner

*Primary Examiner* — Robert Siconolfi
*Assistant Examiner* — Stephen Bowes
(74) *Attorney, Agent, or Firm* — Dickinson Wright PLLC

(57) ABSTRACT

The invention relates to a suspension hydraulic damper (1) comprising a tube (2) filled with working liquid, inside of which a slidable piston assembly (3), provided with compression (12) and rebound (11) valve assemblies and attached to a piston rod (4) led outside the damper (1), is placed, and at least one compression valve system (18, 19). To increase an amount of dissipated energy during extremely fast compression strokes the compression valve system (18, 19) comprises at least one substantially thin closing element (24, 34), preferably in a form of a flat floating disc, having an outside diameter less than the inner diameter of the tube (2) and being axially slidable with respect to the piston rod (4) axis, a spring (23, 33) surrounding the piston rod (4) axis and pressing the closing element against a retainer (26, 35) into an open position, an abutting surface (28, 38) for the closing element (24, 34) in a closed position, and at least one passage (25, 31) for the flow of damping medium in the closed position.

9 Claims, 4 Drawing Sheets

HYDRAULIC SUSPENSION DAMPER

This application claims priority to European Patent Application Number 06024367 filed Nov. 24, 2006.

TECHNICAL FIELD

The present invention relates to a hydraulic damper, in particular to a hydraulic damper for the suspension system of a motor vehicle.

BACKGROUND OF THE INVENTION

Hydraulic suspension dampers typically comprise a tube filled with working liquid, inside of which a slidable piston assembly is placed. The piston assembly is attached to a piston rod led outside the damper through the piston rod guide, and comprises a piston with rebound and compression valve assemblies, which control the flow of working liquid passing through the piston assembly during the rebound and the compression stroke of the damper. Some dampers comprise also a base (bottom) valve assembly with separate rebound and compression valve assemblies controlling the flow of working liquid passing in and out of the compensation chamber, usually formed between the inner and the outer tube of the damper.

Each valve assembly usually comprises a stack of resilient disks, often with an additional compression spring, covering the flow passages of the piston and acting as one way valve, deflecting or moving under the pressure of the working liquid to allow the medium flow. Number, shape, diameter, and thickness of each disk provide, among others, an adjustable compression and rebound damping forces.

Typical damper characteristic of damping force vs. piston velocity is a trade-off between improvement of the car handling properties and reduction of the unwanted car vibrations (a so called NVH—Noise, Vibration, Harshness requirements). Although dampers featuring low compression forces with degressive characteristics are required to improve the passengers comfort, during severe road and/or drive conditions they also often lead to maximally admissible wheel-knuckle displacements in damper compression direction leading to a suspension closure or jounce bumper engagement, which in turn affects the car safety, comfort, durability, and noise issues.

From the state of art, there are known dampers in which the damper compression force increases rapidly after reaching a certain velocity of the piston relative to the damper tube.

An exemplary damper of this type, disclosed in patent specification EP 1 215 414 B1, comprises a valve body fixed to the piston rod and urged away from a valve seat surface formed on the piston by a spring. The valve body has a conical surface which moves toward the valve seat surface as a function of dynamic pressure of a damping medium, bearing against the circular valve seat surface and making a linear contact in a closed position. The valve body is made of a plastic material and its outer diameter corresponds to the diameter of the damper tube. To prevent undefined leakage flows the valve body is sealed to the piston rod.

Another damping unit of this type, to be employed in particular for damping the movement of the vehicle steering device, is disclosed in patent specification EP 0 409 094 B1. The unit comprises two annular valve members allocated to each side of valve seat faces of the piston and urged towards the respective opening positions by a plurality of compression springs provided within axial bores of the piston, wherein at least one face of a pair of the piston valve seat face and the valve face allocated to each other is provided with axial projections and recesses, which in a damping position provides a restricted flow communication for working liquid.

Yet another damper having an additional damper valve is disclosed in patent specification EP 1 538 367 B1. This damper comprises a multipart control slide with a pressure-actuated surface, which can move in a closing direction to close a throttle, where the throttle point is determined by the outside diameter of the control slide and an inside wall of the damper tube. The control slide of this invention must be manufactured very precisely in order to achieve its proper operation and to minimize this issue it has a plastically deformable adjusting area.

SUMMARY OF THE INVENTION

There is an object of this invention to provide a hydraulic suspension damper with at least one compression valve system, which would comprise only a few simple components as compared to previously known designs and would share comparable working characteristic within a large range of their dimensional tolerances in order to minimize the production specific losses, decreasing the costs of large scale production.

Another object of the present invention is to provide at least one compression valve system for existing suspension dampers, which might be employed as an add-on device for their piston and/or base valve assemblies, affecting neither their tuning options of their rebound and compression valve assemblies nor their performance in normal operating range of the piston velocities.

Yet another object of the invention is to provide a suspension-damper system which would beneficially increase an amount of dissipated energy during extremely fast compression strokes, as compared to known designs.

In order to accomplish the aforementioned and other objects, a damper of the kind mentioned in the outset, according to the present invention is provided with at least one compression valve system comprising at least one substantially thin closing element, having an outside diameter less than the inner diameter of the tube and being axially slidable with respect to the piston rod axis, a spring surrounding the piston rod axis and pressing the closing element against a retainer into open position, an abutting surface for the closing element in closed position, and at least one passage for the flow of damping medium in closed position.

The compression valve system of this kind forms one-way, normally open, quick-closing throttling valve which is independent on the piston position and dependent only on the piston velocity. It comprises only a few additional components, which are installed in series with the regular piston and base valve assemblies and provide easy tuning of the engagement velocities and force gains. As the annular area between the closing element and the inner surface of the tube enables a substantially unrestricted flow of working medium in normal operating range of piston velocities, the acceptable dimensional tolerance of the closing element is largely increased.

Preferably, the closing element of the compression valve system has a form of a substantially flat floating disc, which means that without the force of the spring, the disc would be free to displace along and rotate around the piston rod axis, and during the operation of the compression valve system the disc displaces and remains substantially rigid.

The flat floating disc enables improved valve dynamics due to its low mass which beneficially affects a shorter valve response, low impact forces during triggering, an insensitivity on inertial forces caused by the unsprung mass acceleration. The compression valve system wear is decreased due to low impact loading and wide flat contact surfaces.

Preferably, at least one flow passage is formed in the closing element, e.g. in a form of a few substantially axial openings positioned around the disc surface. The compression valve system made according to the principles of the invention may be advantageously located on a piston assembly and/or on a base valve assembly.

Application of the inventive compression valve system solely on a base valve assembly is recommended for dampers with a moderate force gain. The highest force gain can be achieved using a compression valve system according to the invention both on piston and base valve assemblies, in which case they should be properly balanced, in order to avoid cavitation in the extension chamber. Application of the compression valve system only on the piston assembly is also possible if only the cavitation effects of short duration can be tolerated.

Advantageously the compression valve system additionally comprises a sleeve surrounding the spring. Application of the sleeve enables an easy improvement of the existing dampers by the compression valve system of the present invention with no need of substantial modification of their existing designs.

Further, the abutting surface and/or said at least one flow passage may be beneficially formed in the sleeve.

The damper according to the invention may also preferably comprise a socket member surrounded by the sleeve and having the abutting surface which may additionally comprise said at least one flow passage.

The socket member may obviously be made as a single element with the sleeve.

If necessary, a damper made according to the invention may also contain a plurality of compression valve systems located in series one on top of the other.

BRIEF DESCRIPTION OF THE DRAWINGS

The exemplary embodiments of the invention are presented below in connection with the attached drawings on which.

DESCRIPTION OF THE PREFERRED EMBODIMENT

Figure 1:
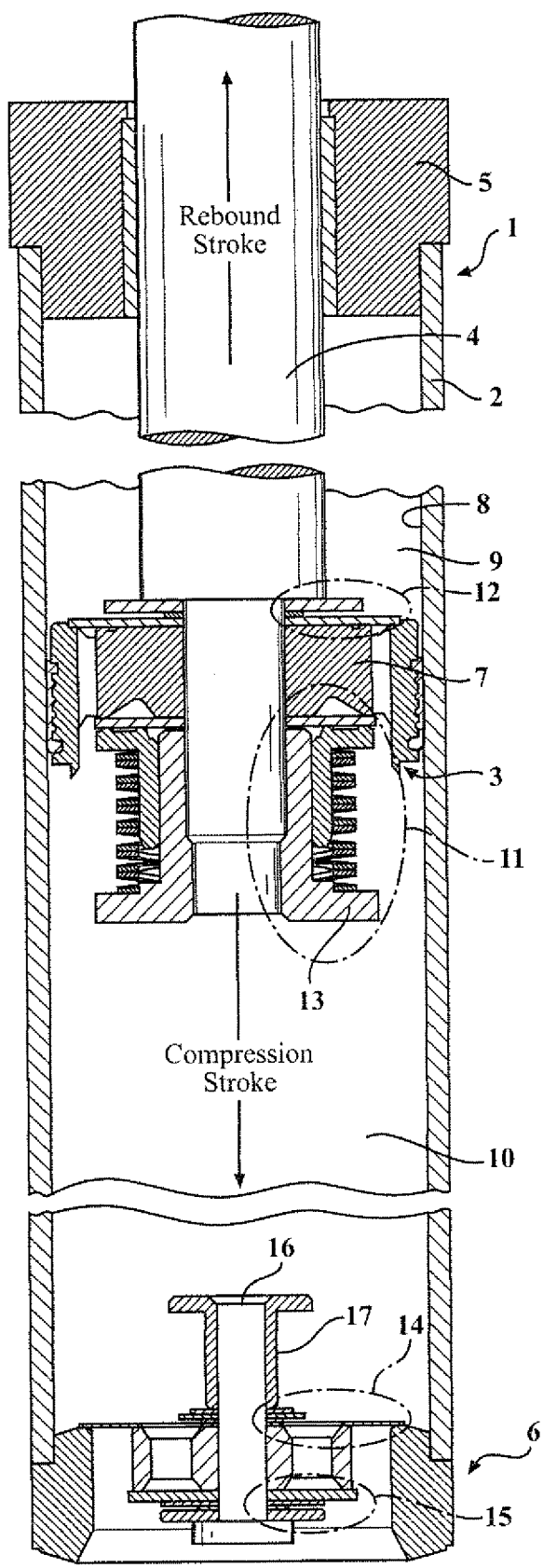
FIG. 1 is a schematic cross-sectional view of a typical twin-tube hydraulic damper.

The hydraulic damper 1 shown in FIG. 1 is an example of a twin-tube damper, where for the simplicity of the drawing only an internal tube 2 is shown. Inside the tube 2, filled with a working liquid, a movable piston assembly 3 is placed. The piston assembly is attached to a piston rod 4, led axially outside the damper 1 through a piston rod guide 5 provided with a seal unit. At the other end, the tube 2 is closed by the base valve assembly 6.

The piston 7 makes a sliding fit with the inner surface 8 of the tube 2 and divides the tube 2 into a rebound chamber 9 and compression chamber 10. The piston assembly 3 further comprises rebound and compression valve assemblies 11 and 12 with appropriate flow passages, to control the flow of working liquid passing through the piston 7 during the rebound and the compression stroke, in order to damp reciprocating movement of the piston 7 with the piston rod 4 relative to the tube 2. In this embodiment, the piston assembly 3 is secured to the piston rod 4 by a threaded sleeve 13 of the rebound valve assembly 11.

The base valve assembly 6 is also provided with rebound 14 and compression 15 valve assemblies with appropriate flow passages, to control the flow of working liquid passing between the compression and the compensation chamber. The compensation chamber can be formed between the inner 2 and the outer tube (not shown) of the damper 1. The valve assemblies 14 and 15 are secured to the base valve assembly 6 by means of a bolt 16 riveted on a washer 17.

The hydraulic shock absorber of this kind with fully tuneable rebound and compression valve assemblies is commonly used as a part of a motor vehicle suspension.

Figure 2:
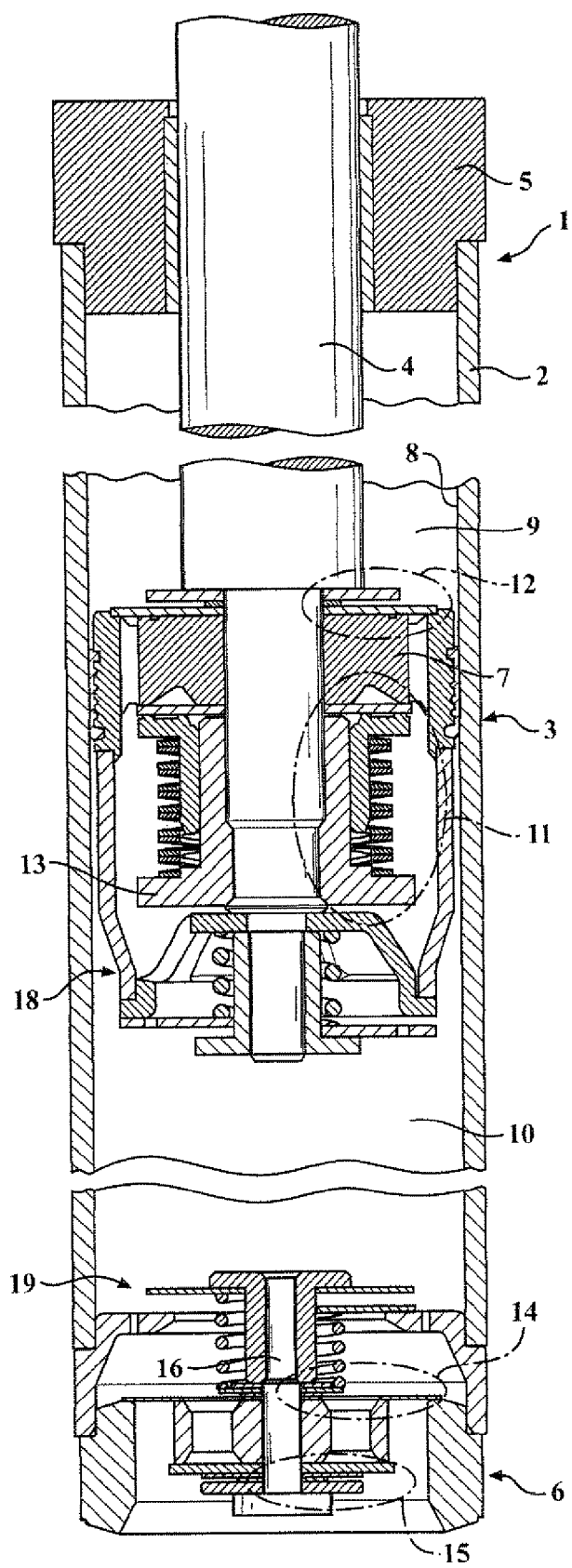
FIG. 2 is a schematic cross-sectional view of a hydraulic damper from FIG. 1 supplemented with two compression valve systems according to the embodiments of the present invention.

The damper, improved by application of two compression valve systems 18 and 19 made according to the principles of the present invention is shown in FIG. 2. Design details of these systems are shown respectively in FIG. 3 and FIG. 4. Reference numerals of the same functional elements correspond to those from FIG. 1.

During the rebound stroke of the piston 7, the working medium passes through the rebound valve assemblies 11 and 14 and wide open sections of the inventive compression valve systems 18 and 19. Also during the compression stroke of the piston 7, within a predefined range of medium piston velocities, the working medium passes freely through the compression valve assemblies 12 and 15 and the compression valve systems 18 and 19, which remain open. In other words the presence of the compression valve systems 18 and 19 does not interfere with the functionality of the rebound valve assemblies 11 and 14 and with the functionality of the compression valve assemblies 12 and 15 in normal, comfort relevant operating range of piston velocities.

Figure 3:
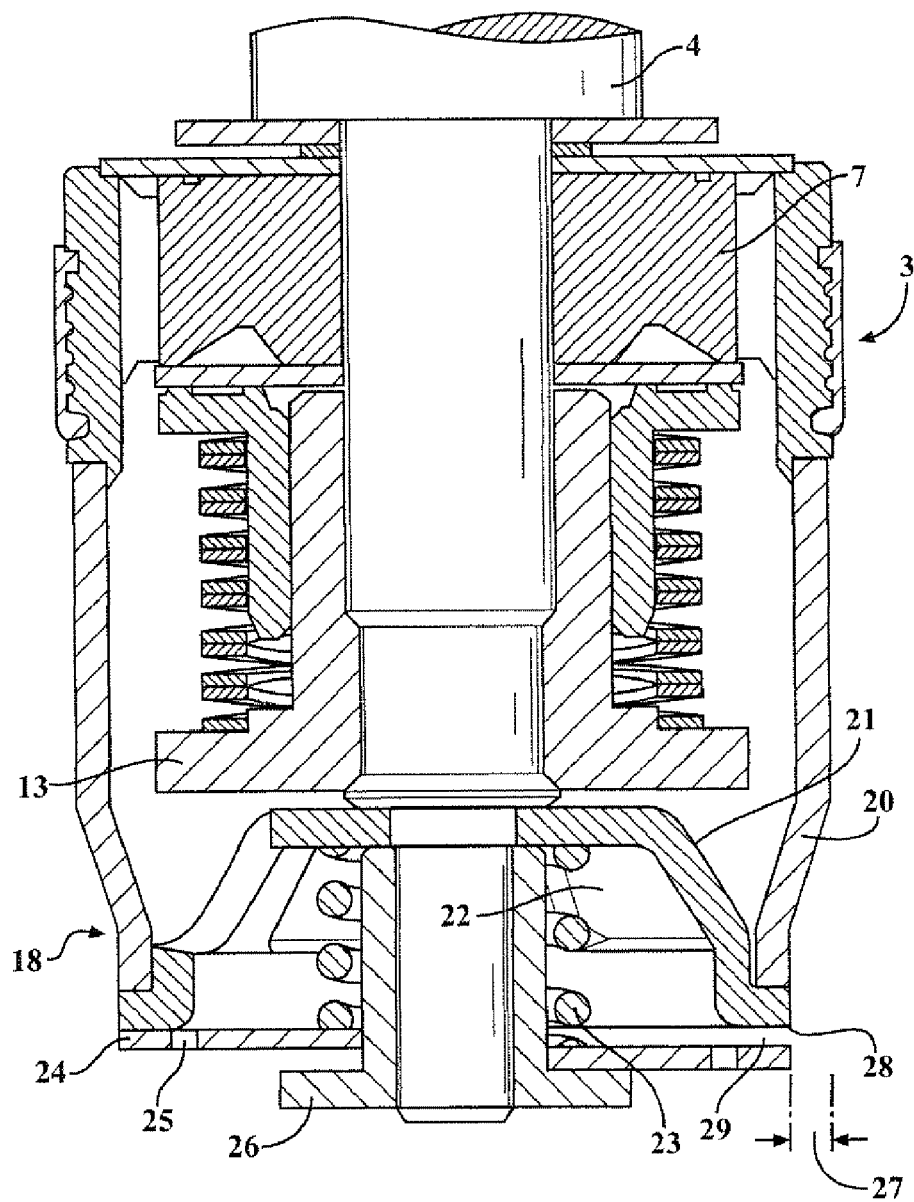
FIG. 3 is a cross-sectional view of an embodiment of the compression valve system according to the present invention installed on a piston assembly of the damper from FIG. 2 in its two terminal working positions.

Reference is now made to FIG. 3 showing the compression valve system 18 in details in closed and opened position respectively in the left and the right side of the drawing. The compression valve system 18 forms an add-on device of the piston assembly 3 and comprises a substantially cylindrical sleeve 20 supported on the piston 7, a socket member 21 with slots 22, a coil compression spring 23, a floating, steel disc 24 with a number of flow passages 25 positioned around the disc surface and a threaded nut-retainer 26 fastened on a tenon of the piston rod 4. Obviously, the application of any other type of the spring such as wave spring, etc. is equally possible. The ratio of the disc 24 outside diameter to the tube 2 inner diameter is preferably within a range of 0.5 to 0.9.

As shown on the left side of the drawing, after reaching a certain threshold of the piston velocity during the compression stroke, the pressure difference across the piston assembly 3 generates a pressure force on the large surface of the floating disc 24 that exceeds the force of the preloaded compression spring 23, leading to a displacement of the disc 24 towards the abutting surface 28 formed by the flange of the socket member 21. During closing of the gap 29 between the floating disc 24 and the abutting surface 28, the flow resistance, and consequently the pressure difference across the piston assembly 3 increases, leading to even more rapid displacement of the disc 24. This feature creates a self intensifying behaviour of the compression valve system 18.

When the gap 29 is finally closed, the restricted flow of medium takes place through the passages 25 in the floating disc 24, which leads to an increase of the damper force. When the piston 7 velocity diminishes below a selected level, the compression spring 23 lifts the floating disc 24, opening the main oil flow through the annular area 27 and the gap 29.

The design parameters of the compression valve system 18 by means of which one may set the velocity threshold, the reaching of which triggers its operation, are the area of the pressure actuated surface of the disc 24, the force of the compression spring 23 and the width of the gap 29. It is worth noting that the width of gap 29 is large enough to create only minimal flow restriction in normal operating range of the damper. Since the mass of the disc 24 is small, the impact forces on the abutting surface 28 and the retainer 24 shall not lead to the system failure or noise generation.

The design parameters influencing the behaviour of the compression valve system 18 after reaching the engaging velocity are the number and the shape (e.g. diameter) of the passages 25 in the disc 24 or in other components of the compression valve system 18, such as e.g. the outer surface of the sleeve 20, where the passages may be additionally or alternatively envisaged.

The application of the floating disc 24 yields beneficially low mass to surface ratio, which in turn affects among others the time delay of the valve response (low inertia of the disc 24) and durability of the compression valve system 18, as the impact forces accompanying the valve system operation are small. Moreover, the annular area 27 between the disc 24 and the inner surface 8 of the tube 2 is large enough not to create any substantial restrictions for the flow of working medium.

All the above features ensure that the working characteristic of the compression valve system remain substantially the same within a large range of dimensional tolerance of its components and even some eccentricity in the axial displacement of the sleeve socket member or disc with regard to the damper axis is fairly acceptable. Therefore their production specific losses are minimized and the cost of large scale production of the valve system is substantially decreased.

Figure 4:
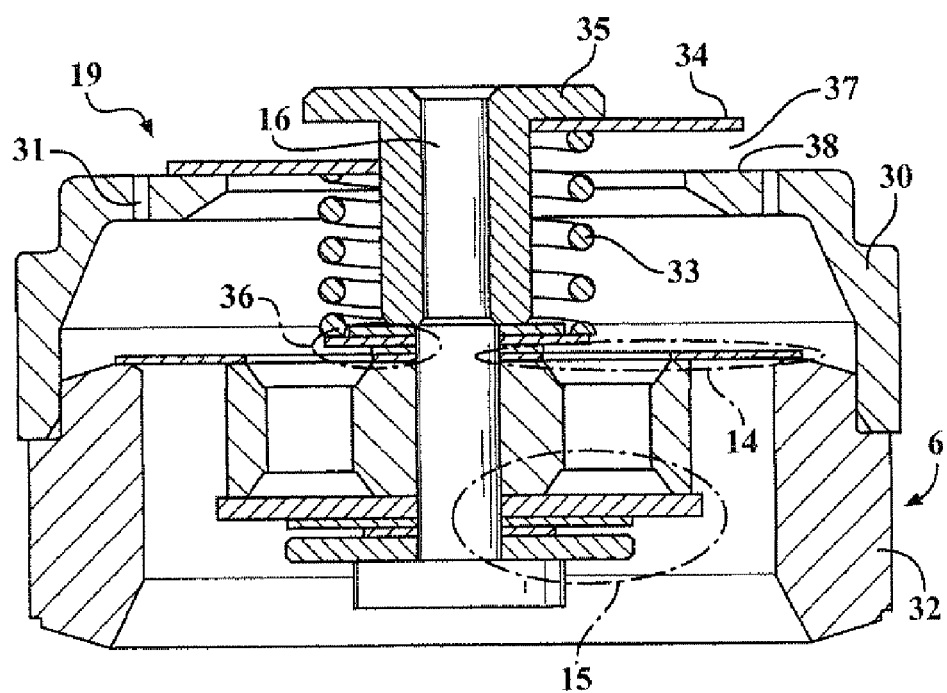
FIG. 4 is a cross-sectional view of an embodiment of the compression valve system according to a present invention installed on a base valve assembly of the damper from FIG. 2 in its two terminal working positions.

Reference is now made to FIG. 4 showing the compression valve system 19 of the base valve assembly 6 in details similarly as in FIG. 3 in closed and opened position. The compression valve system 19 comprises a sleeve 30 and located between the body 32 of the base valve assembly 6 and the compression chamber 10, a compression spring 33, a floating disc 34 and a retainer 35 fastened to the bolt 16, e.g. by means of riveting. The bottom end of the spring 33 rests on a set of spacing washers 36 enabling adjustment of the width of the gap 37 between the disc and the sleeve 30.

The compression valve system 19 according to this embodiment does not comprise a socket member and the abutting surface 38 is formed directly on the sleeve. Also the flow passages 31 are formed in the sleeve. The functionality and behaviour of the compression valve system 19 is however similar to that described above with reference to the compression valve system 18 of the piston assembly 3. The intake disc of the rebound valve assembly 14 of the base valve assembly 6 is not constrained by the additional compression valve system 19 and its operation conditions do not depend on the tuning (e.g. by the adjustment of the gap 37) of the compression valve system 19. During rebound stroke the medium flow takes place in a regular trimmer, i.e. through outer and inner seat of the intake valve, without any deterioration of the regular damper performance.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

Having thus described the invention, it is claimed:

1. A hydraulic damper comprising
   a tube filled with working liquid,
   a slidable piston assembly disposed inside of the tube and provided with a compression valve assembly and a rebound valve assembly,
   a piston rod attached to the piston assembly and extending outside the damper along a piston rod axis,
   a base valve assembly closing an end of the tube and provided with a compression valve assembly and a rebound valve assembly,
   at least one compression valve system supported on the piston assembly,
   the compression valve system including at least one substantially thin closing element having an outside diameter less than the inner diameter of the tube and being axially slidable along the piston rod axis,
   the compression valve system including a spring surrounding the piston rod axis and pressing the closing element against a retainer into an open position,
   the compression valve system including an abutting surface for establishing a closed position of the closing element,
   at least one passage for the flow of damping medium in the closed position, and
   the compression valve system including a sleeve surrounding the spring and interconnecting the compression valve system to the piston assembly for establishing support between the compression valve system and the piston assembly.

2. The hydraulic damper according to claim 1, wherein the closing element has a form of a substantially flat floating disc.

3. The hydraulic damper according to claim 1, wherein at least one flow passage is formed in the closing element.

4. The hydraulic damper according to claim 1, wherein the abutting surface is formed in the sleeve.

5. The hydraulic damper according to claim 1, wherein at least one flow passage is formed in the sleeve.

6. The hydraulic damper according to claim 1, wherein said damper comprises a plurality of compression valve systems located in series.

7. The hydraulic damper according to claim 1, wherein said compression valve system further includes a socket member surrounded by the sleeve and the abutting surface is formed in the socket member.

8. The hydraulic damper according to claim 7, wherein the socket member is a part of the sleeve.

9. The hydraulic damper according to claim 7, wherein at least one flow passage is formed in the socket member.

* * * * *

UNITED STATES PATENT AND TRADEMARK OFFICE
CERTIFICATE OF CORRECTION

| | | |
|---|---|---|
| PATENT NO. | : 8,066,105 B2 | Page 1 of 1 |
| APPLICATION NO. | : 11/985331 | |
| DATED | : November 29, 2011 | |
| INVENTOR(S) | : Michael Maniowski and Waldemar Widla | |

It is certified that error appears in the above-identified patent and that said Letters Patent is hereby corrected as shown below:

Column 5, Line 58: "additional compression" should read -- compression --.

Column 6, Line 2: "trimmer" should read -- manner --.

Signed and Sealed this
Tenth Day of January, 2012

David J. Kappos
*Director of the United States Patent and Trademark Office*